2,205,347

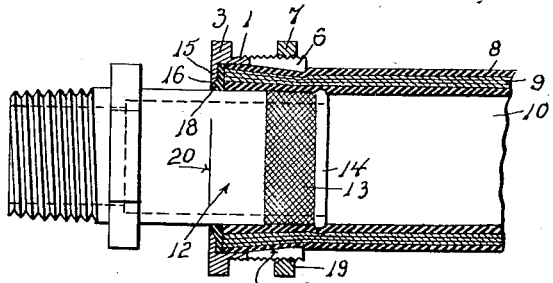
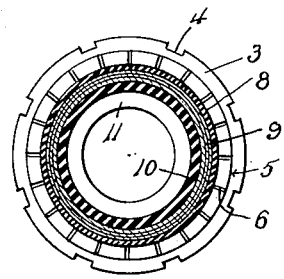
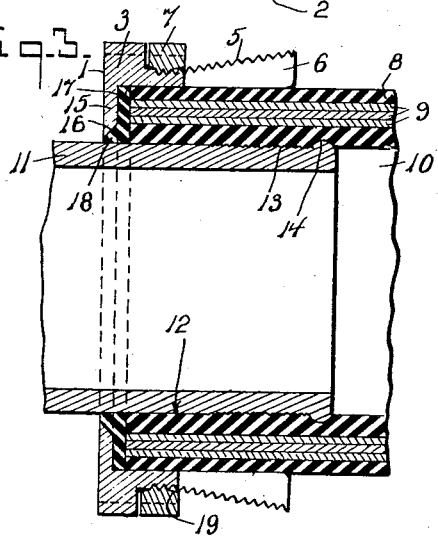
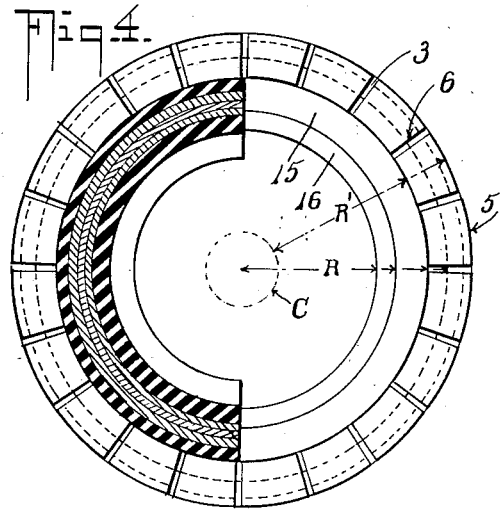
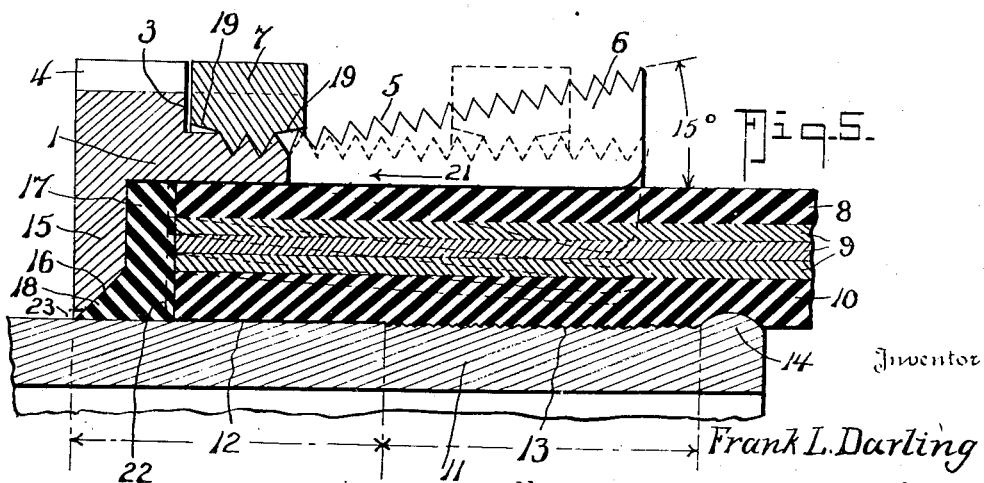
Inventor
Frank L. Darling
by Dieterich & Rutley
Attorneys Patented June 18, 1940

UNITED STATES PATENT OFFICE 2,205,347

HOSE CLAMP

Frank L. Darling, Hollywood, Calif., assignor to Albert E. Dieterich, Washington, D. C.

Application August 25, 1939, Serial No. 291,966

9 Claims. (Cl. 285—86)

My invention relates to a certain new and improved device for securing flexible hose to metal pipes, nipples, etc., and it has for its particular objects to provide a means which will securely hold the hose on the pipe with equal pressure or squeeze over the entire circumference.

The device has been particularly devised for use in securing the rubber hose used on airplanes to the pipes or nipples and especially is it useful to secure the oil lines that lead to the motor lubricating ducts, as, for instance, the ducts for valve lubrication. Heretofore all hose clamps that have been used on airplanes have been found unsafe, in that they break, become loose, or do not apply uniform squeeze or sealing pressure around the hose, with the result that leaks occur, or the connection become loose and separates, often resulting in fire which endangers the lives of the passengers.

My invention has been devised to overcome and does overcome the objectionable features of all hose clamps heretofore used in airplane and airplane motor construction.

A further object is to provide a clamp which will withstand several times the internal hose pressures that hose clamps heretofore used have withstood.

I have found that by knurling the nipple one-half the length of the clamp, beginning the knurl at the outer end of the nipple, the ends of the clamp fingers force the hose into the knurling and at the same time the taper-pressure forces the end of the hose against the closed end of the clamp and effects a perfect seal on the unknurled half of the nipple. By repeated tests I have found that the hose will leak at a given pressure if the entire surface of the nipple is knurled and I have also found that the hose will blow off the nipple under a given pressure if the nipple is not knurled for approximately one-half its length. If the entire surface of the nipple which is under the influence of the clamp is knurled, the knurling will, in large measure, prevent the hose from piling up at the closed end of the clamp.

Other objects will in part be obvious and in part be pointed out hereinafter.

To the attainment of the aforesaid objects and ends the invention still further resides in those novel features of construction, combination and arrangement of parts, all of which will be first fully described in the following detailed description and then be particularly pointed out in the appended claims, reference being had to the accompanying drawing, in which:

Fig. 1 is a central vertical longitudinal section of a hose and coupling, the nipple being shown in elevation.

Fig. 2 is an end view of the parts shown in Fig. 1.

Fig. 3 is an enlarged detail vertical longitudinal section of a hose and nipple with my invention applied, but before clamping action has commenced.

Fig. 4 is a view partly in end elevation and partly in cross section looking at the right-hand end of Fig. 3 (one-half the hose and sealing washer being removed to show the clamp in one-half end elevation).

Fig. 5 is an enlarged detail vertical section showing, in full lines, the position of the parts before the nut is run over to effect clamping action and, in dotted lines, the final position of the parts.

In the drawing, in which like numerals of reference indicate like parts in all the figures, I represents the body of the main clamp member, which, when in the operative position, has a frusto-conical inner wall 2, but which, when the device is made up ready for use, is of approximately cylindrical form, for purposes later understood.

The main clamp member and the nut 7 are preferably manufactured in the manner taught in my aplication filed June 6, 1939, Ser. No. 278,357, of which the present application is a continuation in part. The blank from which the member 1 is made originally has its outer face cylindircal and its inner wall frusto-conical in form.

After the thread is cut, the body is slit or split at intervals, as at 6, the slit extending from the end opposite the shoulder or flange 3 to adjacent the same, but terminating short of the same by about one-third (preferably) the thickness of the nut 7 which cooperates with the fingers formed in the body between the slits 6.

After running the nut 7 onto the body 1 (see Fig. 3) an arbor is passed into the body to spread the fingers so that the inner faces of the fingers will assume a parallel relation to the axis of the body (see Figs. 3 and 5), while the outer threaded faces of the fingers flare outwardly and the body assumes a generally frusto-conical form with the end of lesser diameter adjacent the nut 7. The device is now ready for use.

In the device, in the present embodiment of the invention, an inner web 15 is provided at the shouldered end and this web has an opening for the passage of the nipple 11 and a beveled seat

16 for the tapered portion 18 of a washer and hose-end sealer 17.

In the present embodiment the nut 7 has beveled surfaces 19 the angle of which to the axis is the same, or substantially the same, as that of the outer face of the threaded part of the main clamp member when in the position ready for use (Figs. 3 and 5), while the nut threads are located centrally between the surfaces 19. This enables the nut to be used either side toward flange 3 and also provides, as it were, a funnel guide to assist in swinging the finger ends inwardly toward the axis and relieving the nut threads of a large part of the thrust strains which would otherwise tend to twist or roll the body of the nut. By the structure just described the line of radial thrust by the nut is located close to the center of the nut.

I have found that by providing the nipple 11 with a knurled surface 13 and a smooth surface 12 of approximately equal lengths within the clamp (see Fig. 5) and, preferably, providing a slight bead 14 on the nipple end extended to clear the ends of the clamp fingers somewhat (preferably, a distance equal to the width of the bead 14), the hose will not slip off the nipple under maximum force with the hose, nor will a leak occur. For instance, if the outer end of the nipple be plugged shut, and oil or air pumped into the hose, the hose will burst before the coupling will give way or leak, a thing not heretofore found possible with couplings heretofore commonly employed.

In applying my invention, the coupling member is slipped over the nipple until the end of the soldered part registers with an indicating line 20 placed on the coupling. The washer 17 is then put in place and the hose 8, 9, 10 is forced into the coupling until its end wall engages washer 17 as it lies against web 15 (see Figs. 3 and 5).

The nut 7 is then turned off to the position shown in Fig. 1 (and dotted lines in Fig. 5), which squeezes the fingers inwardly. Since the fingers are thicker at their outer ends than they are adjacent the shoulder 3, as the fingers are squeezed in the rubber fabric of the hose will be displaced and squeezed toward web 15 as well as radially, thereby forcing washer 17, 16 to close the central opening in web 15 around nipple 11 and at the same time seal the ends of the fabric or cord 9 against becoming fouled by oil or other liquid. The endwise movement of the hose in the direction of the arrow 21 (Fig. 5) squeezes washer 17 (see dotted line 22) and forces its rubber out as at 23 to plug, securely, the central hole in web 15.

Since the hose, composed usually of rubber 8, 10, and fabric 9, is resilient, it will be squeezed onto pipe 11 with ever increasing pressure as nut 7 is screwed outwardly. The resiliency of the hose tends to spread the fingers and consequently to cause them to engage the nut more tightly. The spreading of the fingers causes a displacement of the threads from strict alignment with one another (the displacement being greater toward the free ends of the fingers) and this, coupled with the resilient outward or counter pressure of the hose, causes a very tight engagement and more or less binding of the threads of the nut and body, which prevents jars and vibrations from loosening the nut or causing it to work toward the flange 3 again.

In practice, it is preferable to tighten the nut 7 until the outer edges of the threads 5 lie almost in a cylindrical surface, a place where a maximum squeeze is effected without running the nut too close to the edge of the body.

As will be seen by reference to Fig. 4, when the fingers are spread, the radii $R^1$ of the free end are centered in a circle C, the radius of which is equal to the distance that the said outer edge is spread from the initial position to the spread position (Figs. 3 and 5) while the radius of the nut 7 remains fixed.

The outer surface of nut 7 and flange 3 may have ordinary flats for an ordinary wrench, or they may be provided with spanner wrench recesses, or they may be circular and be operated by a strap wrench. The particular shape of the parts 7 and 3 is of no consequence and is, per se, no part of my present invention.

From the foregoing description, taken in connection with the accompanying drawing, it is thought that the complete construction, method of manufacture, and the advantages of the invention will be clear to those skilled in the art to which it relates.

What I claim is:

1. A hose clamp comprising a tubular body having an inner and an outer flange at one end, and threaded from adjacent the outer flange to the opposite end, the inner surface of the body from adjacent the flange toward the end opposite the flange being of general cylindrical form, the outer face of the body from adjacent the flange toward the end opposite the flange being of generally frusto-conical form with the end of greater diameter remote from the flange, and a nut threaded on the threaded portion adjacent the flange, said body having open slots extending from the end opposite the flange longitudinally to adjacent the flange.

2. A hose clamp comprising a tubular body having an outer flange at one end and threaded from adjacent the flange to the opposite end, the inner surface of the body from adjacent the flange toward the end opposite the flange being of general cylindrical form, the outer face of the body from adjacent the flange toward the end opposite the flange being of generally frusto-conical form with the end of greater diameter remote from the flange, and a nut threaded on the threaded portion adjacent the flange, said body having open slots extending from the end opposite the flange longitudinally to adjacent the flange but terminating short thereof to leave a cylindrical portion between the flange and the inner ends of the slots.

3. In combination, a nipple having a knurled surface and a smooth surface adjacent the knurled surface, an elastic hose fitted on said nipple over said surfaces, a hose clamp comprising a tubular body having an inner web at one end, which web is apertured to receive the nipple, said tubular body fitting over the hose on the nipple, the inner surface of said body being of general cylindrical form when first placed over the hose, the outer face of the body from adjacent the web end to the other end being of generally frusto-conical form when the body is first placed over the hose, the end of greater diameter being located at said other end, and a nut threaded on the threaded portion, said body being longitudinally slotted from said other end inwardly a predetermined distance.

4. In combination, a nipple having a knurled surface and a smooth surface adjacent the knurled surface, an elastic hose fitted on said nipple over said surfaces, a hose clamp comprising a tubular body having an inner web at one end, which web is apertured to receive the nipple, said tubular body fitting over the hose on the nipple, the inner surface of said body being of general cylindrical form when first placed over the hose, the outer face of the body from adjacent the web end to the other end being of generally frusto-conical form when the body is first placed over the hose, the end of greater diameter being located at said other end, a nut threaded on the threaded portion, said body being longitudinally slotted from said other end inwardly a predetermined distance, and a combined sealing and hose-end protecting washer in said body between said web and the hose end, by virtue of all of which as the nut is screwed over the frusto-conical slotted end the hose material will be squeezed to the nipple and toward the washer to force the entire hose end into sealing pressure contact with the washer.

5. A hose clamp comprising a tubular body having an inner web at one end with a central aperture and having slits extending inwardly from the other end to provide a plurality of fingers, said body being externally threaded from adjacent the web end to the other end of the body, the inner surface of the body from said web to said other end being of general cylindrical form, the outer face of the body from said other end toward the first end being of general frusto-conical form with the end of greater diameter located at said outer end, and a nut threaded on said threaded portion, the inner diameter of the nut corresponding to the outer diameter of the threaded part of the body having the least external diameter.

6. A hose clamp comprising a tubular body having an inner web at one end with a central aperture and having slits extending inwardly from the other end to provide a plurality of fingers, said body being externally threaded from adjacent the web end to the other end of the body, the inner surface of the body from said web to said other end being of general cylindrical form, the outer face of the body from said other end toward the first end being of general frusto-conical form with the end of greater diameter located at said other end, and a nut threaded on said threaded portion, the inner diameter of the nut corresponding to the outer diameter of the threaded part of the body having the least external diameter, said nut having beveled internal surfaces at the sides, the threaded part of the nut being located approximately centrally between said beveled surfaces.

7. A hose clamp comprising a tubular body having an inner web at one end with a central aperture and having slits extending inwardly from the other end to provide a plurality of fingers, said body being externally threaded from adjacent the web end to the other end of the body, the inner surface of the body from said web to said other end being of general cylindrical form, the outer face of the body from said other end toward the first end being of general frusto-conical form with the end of greater diameter located at said other end, and a nut threaded on said threaded portion, the inner diameter of the nut corresponding to the outer diameter of the threaded part of the body having the least external diameter, said nut having beveled internal surfaces at the sides, the threaded part of the nut being located approximately centrally between said beveled surfaces, the angle of said beveled surfaces corresponding to the angle of the outside face of the frusto-conical part of the body.

8. In combination, a nipple having a knurled surface for gripping, and a smooth surface for sealing, an electric hose fitted on said nipple over said surfaces, a hose clamp fitted over said hose in radial alignment with said surfaces and comprising a body having an annular part lying in radial alignment with said smooth surface and having gripping fingers whose free ends lie in radial alignment with said knurled surface, means for forcing said fingers into gripping relation to said hose, abutment means for the end of the hose cooperating with said fingers by virtue of which when said fingers are forced into said gripping relation they will effect a direct compression of the hose against said knurled surface and a built-up pressure of the hose against said smooth surface.

9. In combination, a nipple having a knurled surface for gripping, and a smooth surface for sealing, an elastic hose fitted on said nipple over said surfaces, a hose clamp fitted over said hose in radial alignment with said surfaces and comprising a body having an annular part lying in radial alignment with said smooth surface and having gripping fingers whose free ends lie in radial alignment with said knurled surface, means for forcing said fingers into gripping relation to said hose, abutment means for the end of the hose cooperating with said fingers by virtue of which when said fingers are forced into said gripping relation they will effect a direct compression of the hose against said knurled surface and a built-up pressure of the hose against said smooth surface, and means interposed between the abutment means and the hose end for sealing the end wall of the hose to prevent wick action by the exposed fabric of the hose.

FRANK L. DARLING.

CERTIFICATE OF CORRECTION.

Patent No. 2,205,347. June 18, 1940.

FRANK L. DARLING.

It is hereby certified that error appears in the printed specification of the above numbered patent requiring correction as follows: Page 3, second column, line 22, claim 8, for the word "electric" read --elastic--; and that the said Letters Patent should be read with this correction therein that the same may conform to the record of the case in the Patent Office.

Signed and sealed this 13th day of August, A. D. 1940.

(Seal)

Henry Van Arsdale,
Acting Commissioner of Patents.